US008769016B2

(12) United States Patent
Jakobson

(10) Patent No.: US 8,769,016 B2
(45) Date of Patent: *Jul. 1, 2014

(54) COLLABORATIVE WEB BROWSING SYSTEM

(75) Inventor: Gabriel Jakobson, Alamo, CA (US)

(73) Assignee: Zebedo, Alamo, CA (US)

( * ) Notice: Subject to any disclaimer, the term of this patent is extended or adjusted under 35 U.S.C. 154(b) by 126 days.

This patent is subject to a terminal disclaimer.

(21) Appl. No.: 13/588,920

(22) Filed: Aug. 17, 2012

(65) Prior Publication Data

US 2013/0218964 A1 Aug. 22, 2013

Related U.S. Application Data

(60) Provisional application No. 61/600,123, filed on Feb. 17, 2012.

(51) Int. Cl.
*G06F 15/16* (2006.01)
(52) U.S. Cl.
USPC .......................................................... 709/204
(58) Field of Classification Search
CPC ....... G06Q 30/02; G06Q 50/01; G06Q 30/06; G06Q 30/0601
USPC .......................................................... 709/204
See application file for complete search history.

(56) References Cited

U.S. PATENT DOCUMENTS

| 2003/0225836 | A1* | 12/2003 | Lee et al. ...................... 709/205 |
| 2005/0033656 | A1* | 2/2005 | Wang et al. .................... 705/26 |
| 2010/0082746 | A1* | 4/2010 | Ulrich et al. .................. 709/204 |
| 2010/0299616 | A1* | 11/2010 | Chen et al. ..................... 715/753 |
| 2011/0119352 | A1* | 5/2011 | Perov et al. .................... 709/218 |
| 2011/0178889 | A1* | 7/2011 | Abraham et al. ............. 705/26.1 |
| 2012/0089659 | A1* | 4/2012 | Halevi et al. .................. 709/201 |
| 2013/0018960 | A1* | 1/2013 | Knysz et al. .................. 709/204 |
| 2013/0191451 | A1* | 7/2013 | Tse et al. ....................... 709/204 |

FOREIGN PATENT DOCUMENTS

EP 2565840 A1 * 3/2013

* cited by examiner

*Primary Examiner* — Kostas Katsikis
(74) *Attorney, Agent, or Firm* — Staniford Tomita LLP

(57) ABSTRACT

The present invention is directed towards to computerized social networks and e-commerce and facilitating ad-hoc screen sharing and co-browsing between users of a social network. The collaborative browsing method comprises a server computer having a Shopping With A Friend (SWAF) server engine coupled to a database, a SWAF client engine coupled to the SWAF server engine and a plurality of client computers each having a web browser program that runs the SWAF client engine. The web browser program does not include a collaboration plug-in.

2 Claims, 15 Drawing Sheets

COLLABORATIVE WEB BROWSING SYSTEM

CROSS REFERENCE TO RELATED APPLICATIONS

This application claims priority to U.S. Provisional Patent Application No. 61/600,123, COLLABORATIVE WEB BROWSING SYSTEM, filed Feb. 17, 2012 which is hereby incorporated by reference.

FIELD OF INVENTION

The present invention relates to computerized social networks and e-commerce. More particularly, the present invention relates to facilitating ad-hoc screen sharing and co-browsing between users of a social network.

DESCRIPTION OF THE DRAWINGS

For a more complete understanding of the present invention and further advantages thereof, references are now made to the following Detailed Description, taken in conjunction with the drawings, in which:

FIG. 1 is a generalized block diagram illustrating implementing a shop-with-a-friend ("s.w.a.f") system in conjunction with a social network.

DETAILED DESCRIPTION

Figure 2:
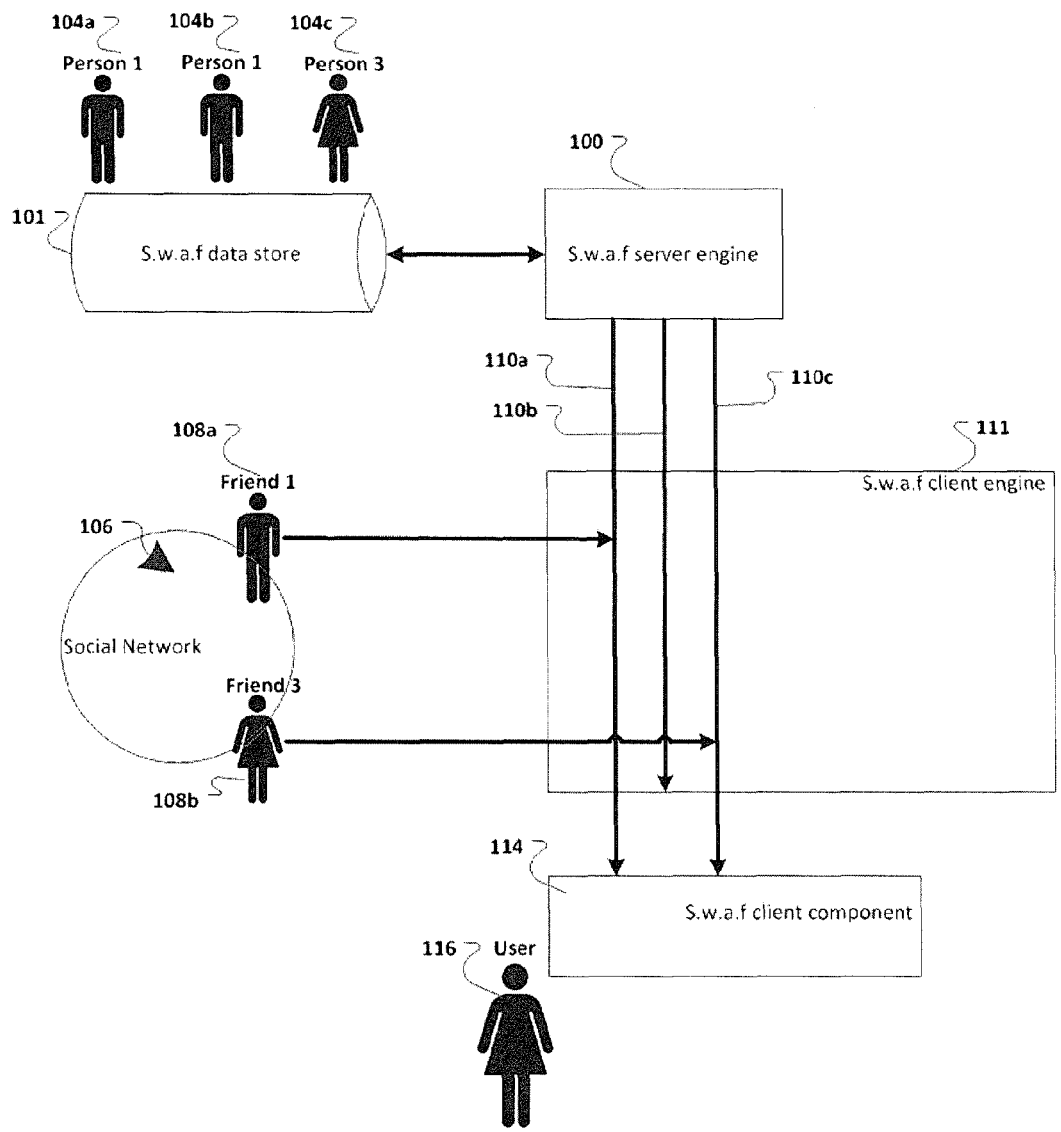
FIGS. 2a and 2b are generalized block diagrams illustrating architecture of a s.w.a.f mechanism, in one possible embodiment.

FIG. 1 is a generalized block diagram illustrating implementing a shop-with-a-friend ("s.w.a.f") system in conjunction with a social network.

The s.w.a.f mechanism is comprised of a "s.w.a.f. engine" 100, the s.w.a.f engine residing on servers accessible to a client via a web-browsing mechanism; and, a "s.w.a.f client engine" 111, residing on a device accessible to the user and communicating with the s.w.a.f server engine 100 over a network (e.g. the Internet.)

In the present example, users "Person 1" 104b, "Person 2" 104c, "Person 3" 104c may be using a system which utilizes the s.w.a.f server engine 100. For example, users 104a-104c may be on one or more websites tied into the s.w.a.f engine 100. The s.w.a.f engine 100 may utilize a data-store 101, e.g. a database, containing, among other data, data pertaining to the users 104a-104c.

The client s.w.a.f engine 111 may receive information from the s.w.a.f engine 100, via communication channels 110a-110c. In this example, for illustrative purposes only, the communications channels 110a-110c may correspond directly with the users 104a-104c, respectively (e.g. communications channel 110a may carry information pertaining to "Person 1" 104a.)

A user 116 may be connected to the s.w.a.f server 100 via a s.w.a.f client component 114, communicating with the s.w.a.f client engine 111. The s.w.a.f client engine 111 may receive information pertaining to all users connected to the swaf server 100: "Person 1" 104b, "Person 2" 104c and "Person 3" 104c.

The information received by the swaf client engine 111 may be further filtered to include only users who are "friends" (the definition of a "friend" defined by a social network) of the User 116 on the social network 106, accessible by the swaf client engine 111.

The information received via the swaf engine 111, via channels 110a-110c, corresponding to the users 104a-104c, may be further filtered by the swaf client engine 111 to present the user 116 with information pertaining only to his/her friends, as defined in the social network 106.

In one possible embodiment, the User 116 may only see (i.e. have access to, be able to interact with, etc.) "Person 1" 104a and "Person 3" 104c, because these people have profiles in the social network 106 (as "Friend 1" 108a and "Friend 3" 108b) and because these people are friends of the User 116 in the social network 106.

In another related possible embodiment, the users "Person 1" 104a and "Person 3" 104c may be able to see and/or interact with the User 116, via the swaf mechanism, by virtue of being friends on the social network 106.

In other possible embodiments, various other rules may be implemented, and options presented to users, allowing, disallowing and limiting electronic interactions via the swaf mechanism, based on social network relationships and other factors.

Figure 2A:
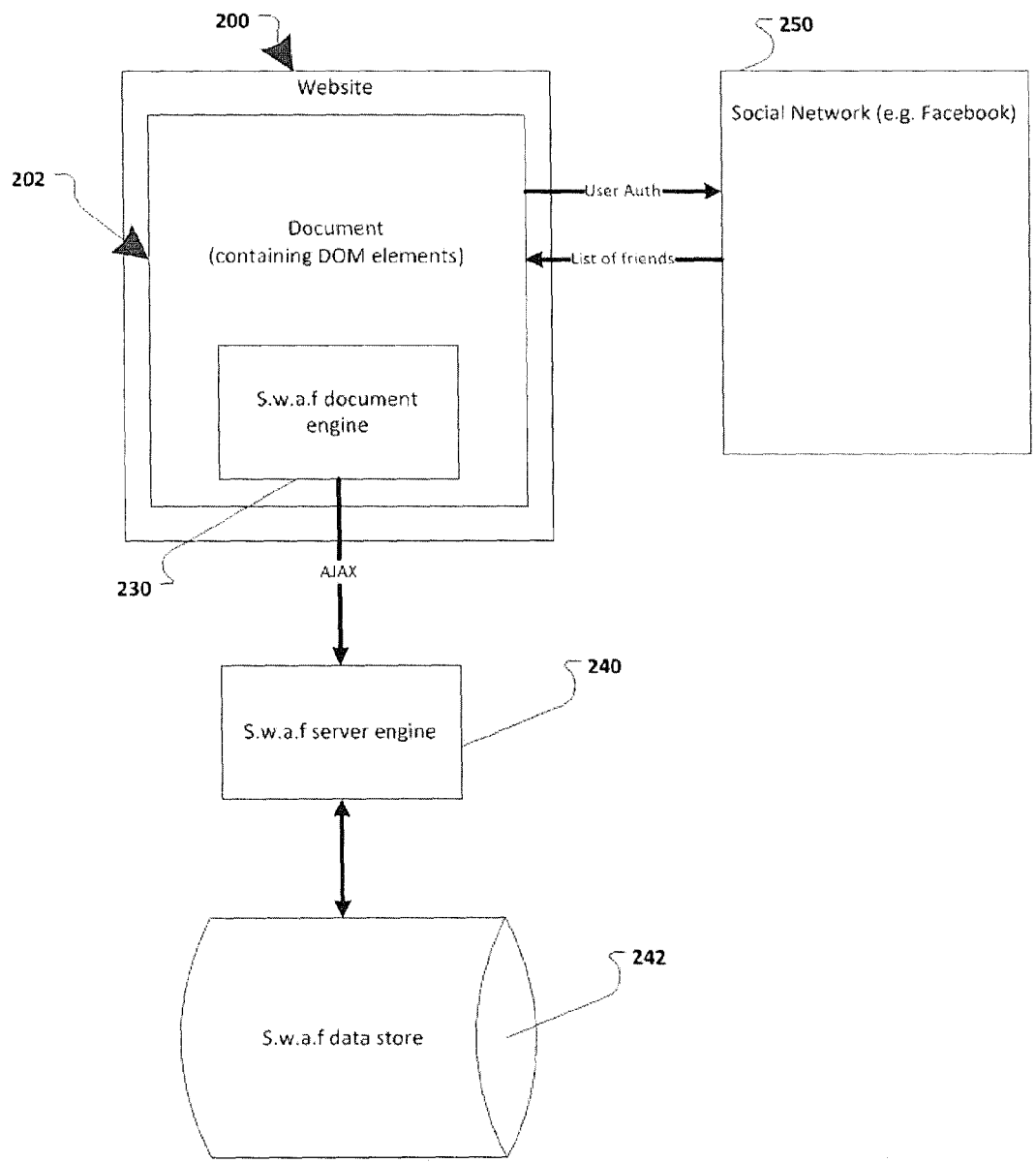
Figure 2B:
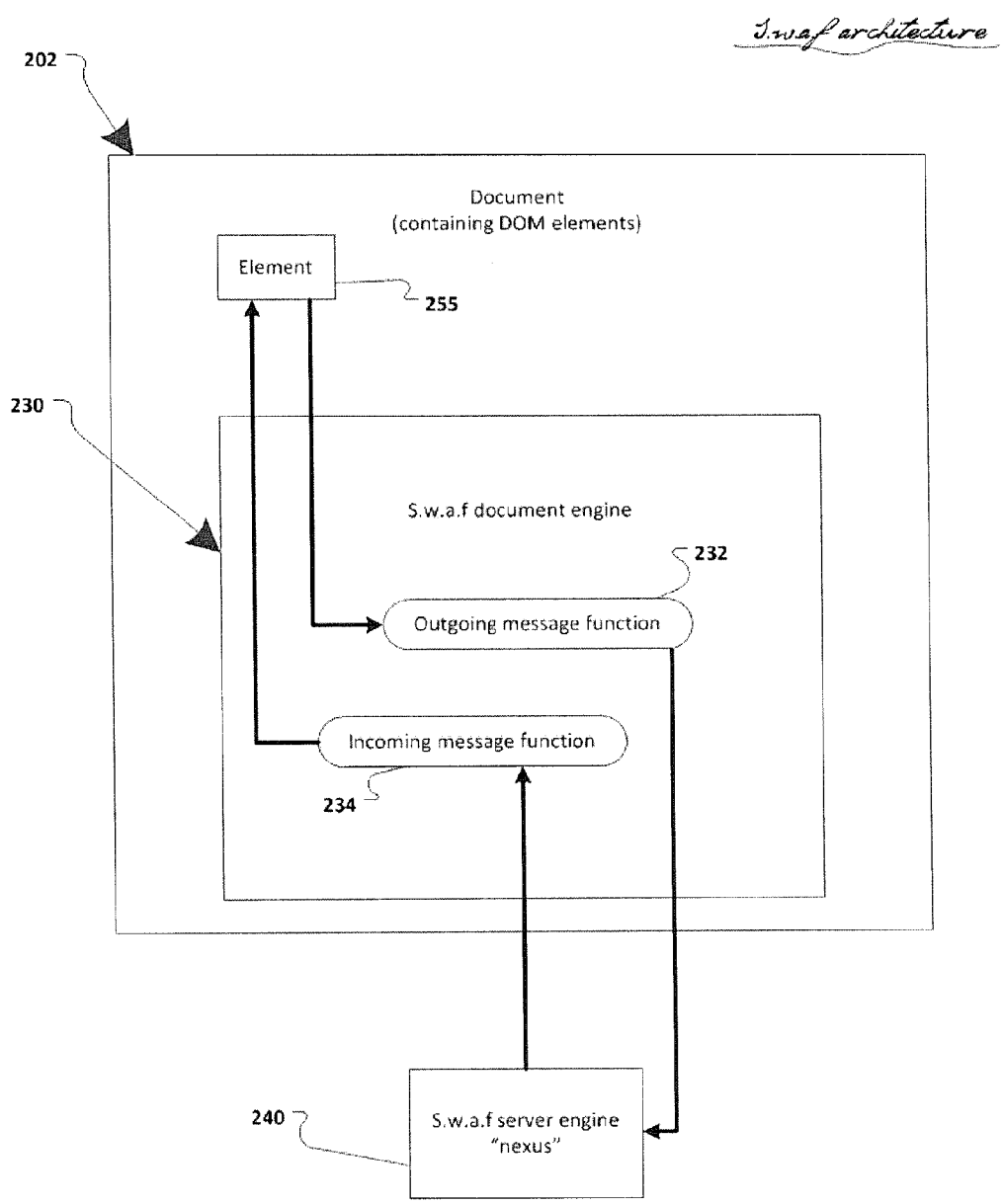

FIGS. 2a and 2b are generalized block diagrams illustrating architecture of a s.w.a.f mechanism, in one possible embodiment. A website 200 may communicate with a social network 250 (e.g. Facebook®) Each user commences interaction with the website 200 by visiting the website's 200 URL (i.e. web address, e.g. www.amazon.com)

The website 200 may allow the user to log into the social network 250 by using the user's social network 250 credentials. Once the user has logged into their social network 250 profile, the website 200 may gain access to the user's social graph, including the user's list of friends, etc.

The website 200 may be rendered on the user's electronic device via a web-browsing application (e.g. Internet Explorer®, Chrome®, Safari®, etc.) In rendering the contents of the website 200, the user electronic device's web-browsing application may create a document 202 containing user-sided-representation of the website 200. The document 202 may contain DOM elements (Document Object Model)

accessible programmatically and visible to the user. For example: dialog boxes, input fields, buttons, etc.

The document 202 may contain (or have access to) a s.w.a.f document engine 230. The s.w.a.f document engine 230 may be a library of Javascript and/or JQuery code which facilitates communication between the document 202 and its elements, and a s.w.a.f server engine 240, which in turn, facilitates communications with remote users and their documents.

The s.w.a.f server engine 240 may be written in a server-side coding language (e.g. PHP, Ruby on Rails, C++, Java, etc.) and communicate with the s.w.a.f document engine 230. The communication between the s.w.a.f document engine 230 and the s.w.a.f server engine 240 may be facilitated using AJAX (Asynchronous JavaScript and XML), or any other protocol.

The s.w.a.f server engine 240 may communicate with a data store 242, the data store 242 storing records on users' live usage of the s.w.a.f system, including, but limited to, a period heart-beat from each user's s.w.a.f engine and instructions sent from one user to another.

Referring now to FIG. 2b, the document 202, displayed in the user's web-browser, may contain elements 255 (e.g. a button, an input field, a selection field, a drop-down box or any other object displayed on a website). The s.w.a.f document engine 230 may contain modules for facilitating synchronized communication between documents used be two or more remote users.

One module may be a function for processing outgoing messages 232. The function for processing outgoing messaging 232 may communicate with elements 255 in the document 202, specifically querying their state and responding to events generated by the elements 255. The function for processing outgoing messages 232 may then transmit messages reflecting changes in the elements 255, onto the s.w.a.f server engine 240.

For example, the element 255 may represent a button invoking a "purchase" function in the document 202, while the document 202 represents a page in the Amazon.com® website depicting a certain item. In this example, in response to a user's clicking the "purchase" button associated with the element 255, the function for processing outgoing messages 232 may create an electronic message depicting the clicking action, and transmit it, via AJAX, onto the s.w.a.f server engine "nexus" system 240.

Another module within the s.w.a.f document engine 230 may be a function for processing incoming messages 234. The function for processing incoming messages 234 may receive and process from the s.w.a.f server engine 240, messages affecting elements in documents in other users' web browsers, and invoke corresponding action on elements 255 on the present document 202.

For example, the s.w.a.f server engine 240 may contain an electronic instruction to invoke a "purchase" button within a document in the user's browser, the electronic instruction generated by a remote user clicking a corresponding "purchase" button on their web browser. The function for processing incoming messages 234 may receive the message from the s.w.a.f server engine 240, and may then send a "click" instruction to the corresponding element 255 (i.e. "purchase" button in this example) on the user's local browser.

FIGS. 3a-3e are generalized block diagrams illustrating database architecture in an implementation of a s.w.a.f system, according to one possible embodiment of the present invention. Due to the fact that users' browsers are not able to communicate with each other directly, a database 310 may be utilized to broker communication between various web browsers.

User1 and User2 may utilize webbrowsers that include s.w.a.f modules 300 and 302, respectively. The s.w.a.f modules 300 and 302 may communicate with a s.w.a.f server 308, which in turn, may store information in a data store 310. The s.w.a.f modules 300 and 302 may be embedded in a hosted website 306, which in turn communicates with a social network 304.

For example, the website 306 may be www.zebedo.com, www.amazon.com, http://apps.facebook.com/shopzebedo, etc. and may allow a user access to a social network 304, such as Facebook®. The system depicted in this illustration allows multiple users accessing the same website 306 to synchronize their viewing and using the website 306 from different browsers.

The data store 310 may contain records containing s.w.a.f-related information on the users User1 and User2, form the s.w.a.f modules 300 and 302 associated with those users. In a presently-preferred embodiment, the data store 310 may contain a row of data in one table per user.

The data store 310 is illustrated here containing two rows of information: a top-row containing data-elements 312a-312d, associated with User1's s.w.a.f module 300; and, a bottom-row containing data-elements 314a-314d, associated with User2's s.w.a.f module 302.

In this example, the "bizID" column contains value "ABC" 312a corresponding to user1's s.w.a.f module 300, and value "ABC" 314a corresponding to user2's s.w.a.f module 302. In cases where one single s.w.a.f instance is handling two or more websties/businesses, it may be advantageous to identify each s.w.a.f database 310 record with a unique business ID to insure users on different websites are not able to shop together, while on different websites.

In this example, the "uID" column contains value "12345" 312b corresponding to user1's s.w.a.f module 300, and value "6789" 314b corresponding to user2's s.w.a.f module 302. Similarly, the "uName" column contains value "User1" 312c corresponding to user1's s.w.a.f module 300, and value "User2" 314c corresponding to user2's s.w.a.f module 302.

Values in the database 310 may be updated via a "heart-beat" periodic message, e.g. of initial frequency of 3 Hz, transmitted by the s.w.a.f modules 300 and 302, populating corresponding database rows, including last-checkin-timestamps 312d and 314d. All database communications may generally be originated by the s.w.a.f modules 300 and 302, transmitting messages to the s.w.a.f server engine 308, which writes information into the database 310, reads information and transmits relevant information back to the s.w.a.f modules 300 and 302.

Heartbeat (or synch) frequency may be set to vary depending on state of connectivity. For example, "idle" frequency, i.e. when user is not connected via a s.w.a.f session to any other user, may be set to 3 Hz. When sending a connection request and awaiting a reply, the heartbeat frequency may be increased to 1 Hz. When connected to a remote user via a live s.w.a.f joint-shopping session, the synch frequency may be increased to 0.2 Hz (to allow for smoother, more real-time synchronized action between users, for example, when one user clicks on a button, the corresponding button on the other user's screen should experience a click almost at the same time.) When a s.w.a.f live shopping session is terminated or discontinued, synch frequency may decreased to consume less system resources.

In one preferred embodiment of the present invention, "stale" records (e.g. records older than 2 minutes) may be cleared up by the s.w.a.f server engine 308 when the latter is called by any of the s.w.a.f modules 300 and 302. In other potential embodiments, the database 310 may be "self-cleaning", i.e. delete own stale records; or a service/process within, or outside of the s.w.a.f server engine 308, may clean stale database records.

Figure 3A:
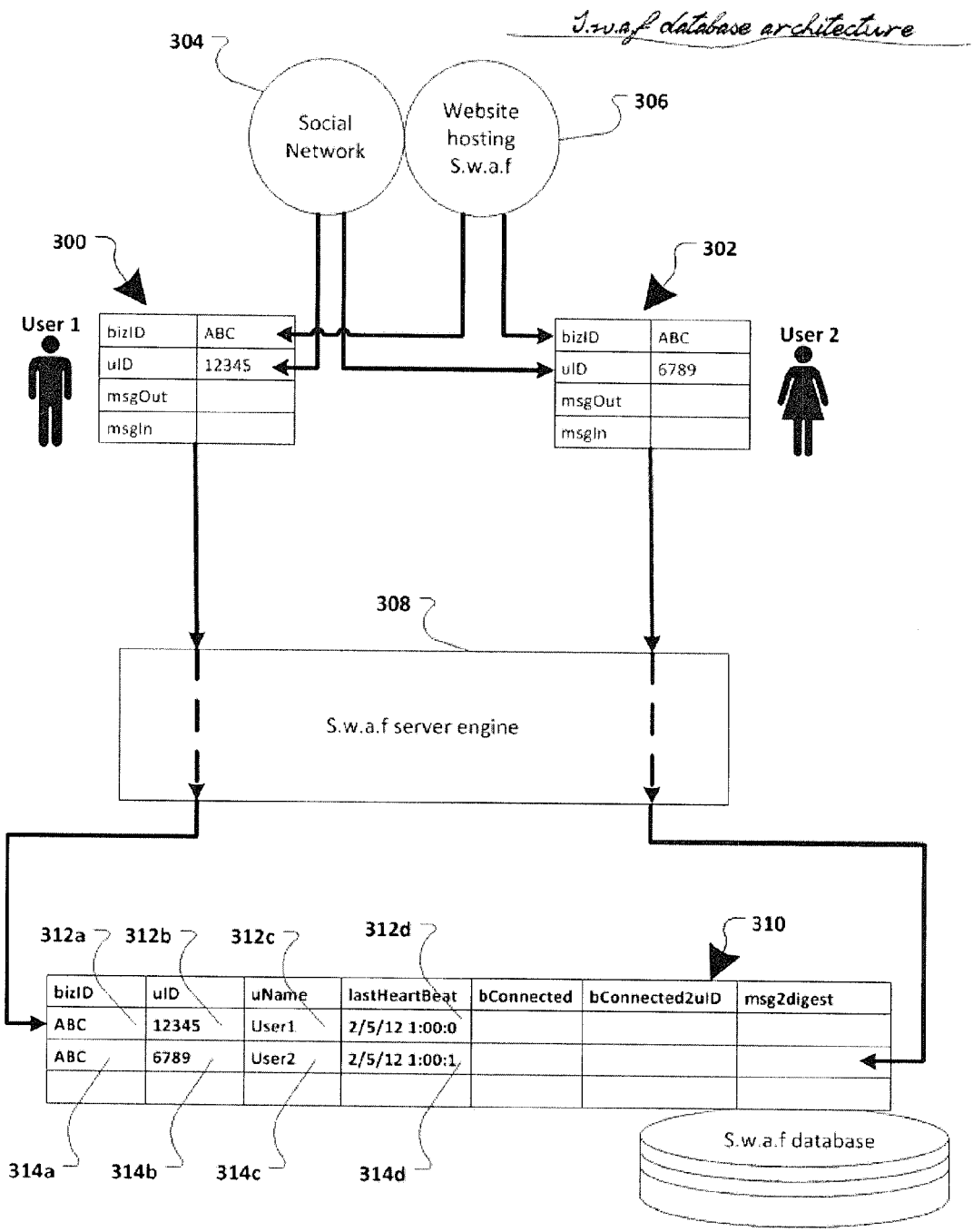
FIGS. 3a-3e are generalized block diagrams illustrating database architecture in an implementation of a s.w.a.f system, according to one possible embodiment of the present invention.
Figure 3B:
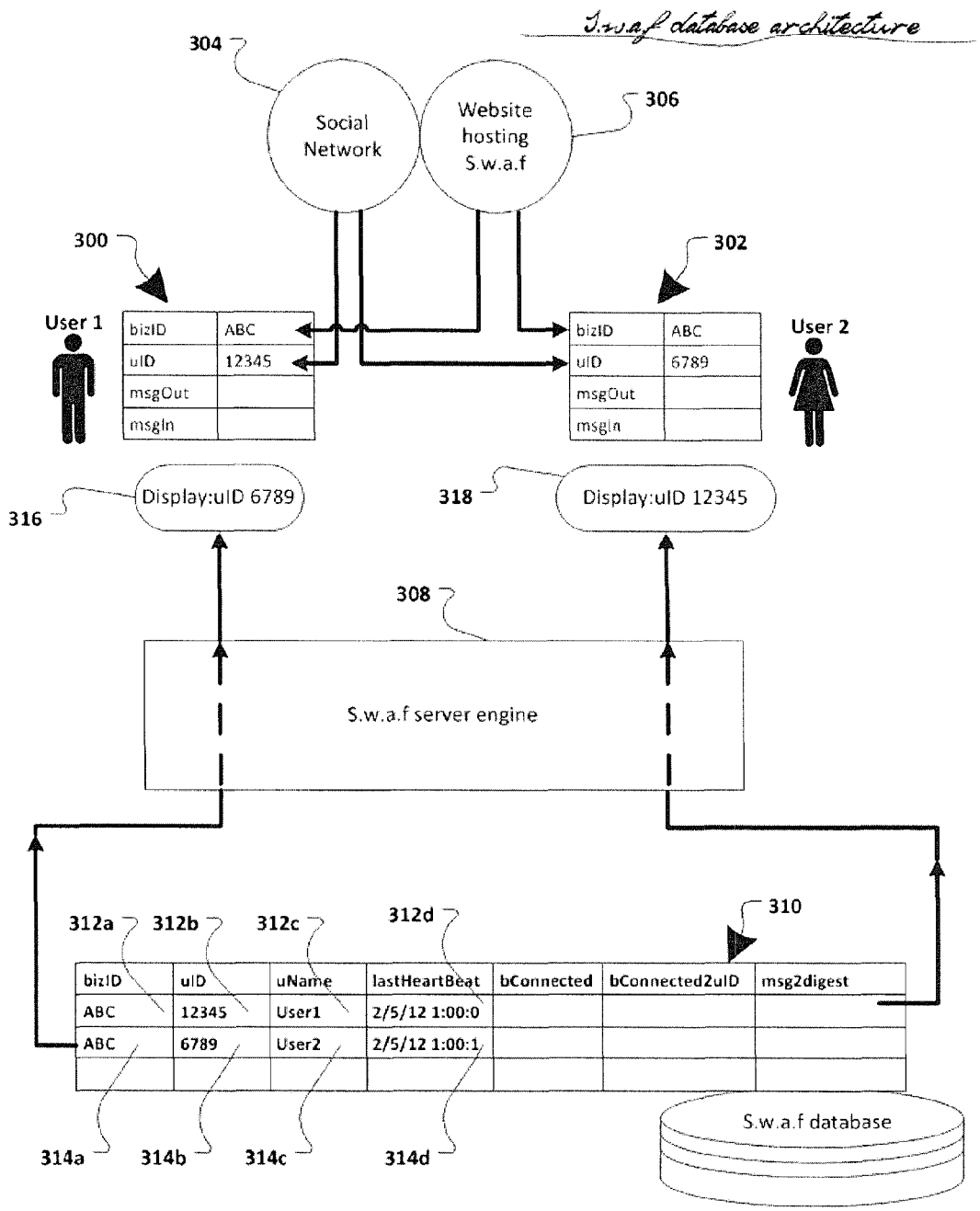

Referring now to FIG. 3b, the s.w.a.f modules 300 of User1 may query the "User2 row" (314a-314d) of the database 310, via the s.w.a.f server engine 308, and display to User1 information 316 pertaining to User2 (e.g. User2's name and any other pertinent information.) Similarly, the s.w.a.f modules 302 of User2 may query the "User1 row" (312a-312d) of the database 310, via the s.w.a.f server engine 308, and display to User2 information 318 pertaining to User1. This functionality may allow a user to see what other users are "present" at a given store in real time, and engage in a live interactive session with them.

Figure 3C:
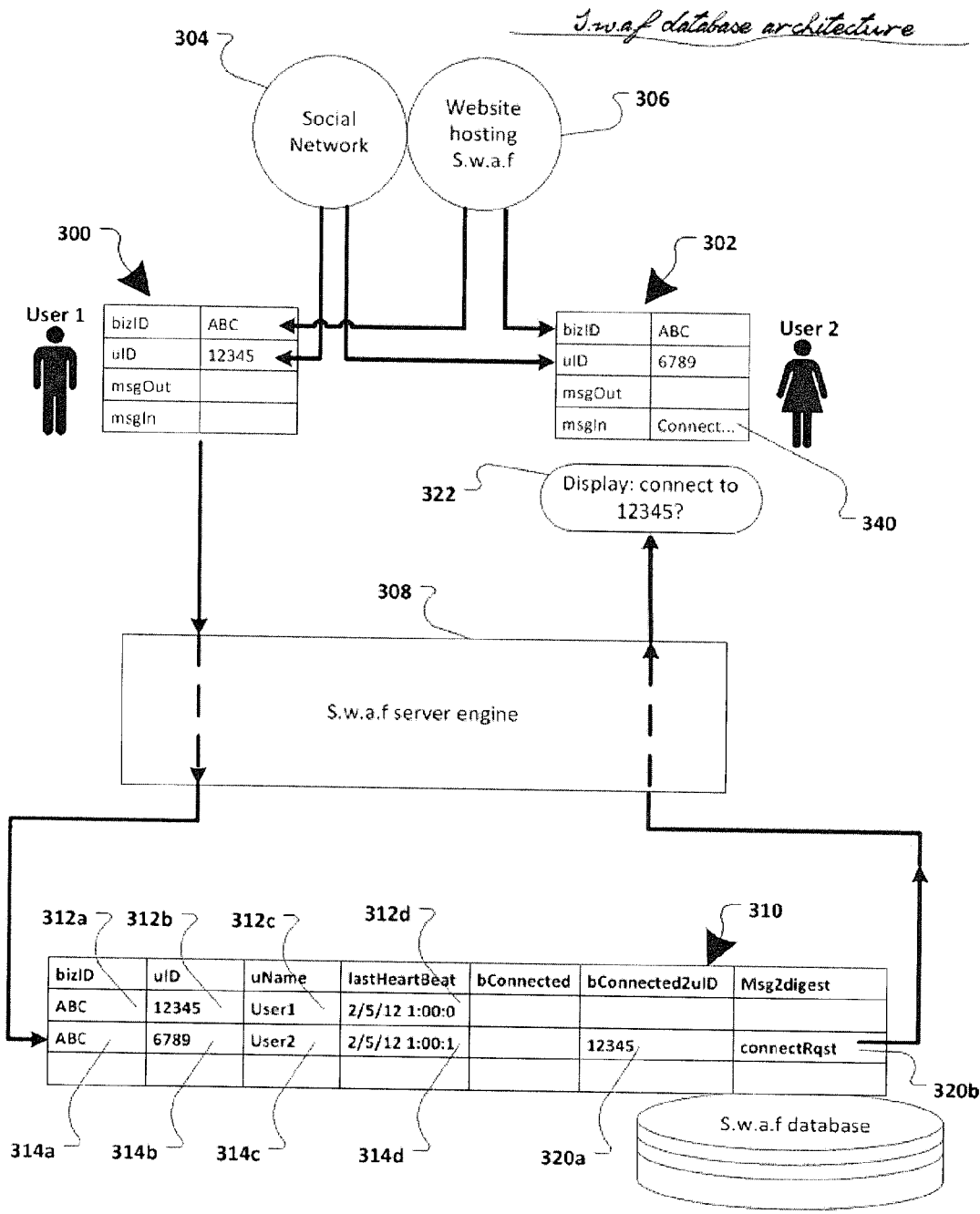

Referring now to FIG. 3c, User1 may choose to initiate a live s.w.a.f session with User2. User1's s.w.a.f module 300 may transmit a message to the s.w.a.f server engine 308, which in turn may place a request for connection 320a and 320b, in "User2's row" in the database 310. In one possible embodiment, the message may be comprised of the requesting-user's-uID "12345" 320a, and an instruction representation request to connect "connectRqst" 320b.

As the s.w.a.f modules 302 of User2 performs periodic heartbeat-read/writes into the database 310, via the s.w.a.f module 308, the s.w.a.f modules 302 may read the request-to-connect instruction 320b (as well as all other associated connection request information from User2's row/record in the database 310) and may display the information 322 to User2 (e.g. "User1 wishes to shop with you, would you like to accept?"). User2 may then accept or reject the invitation.

Figure 3D:
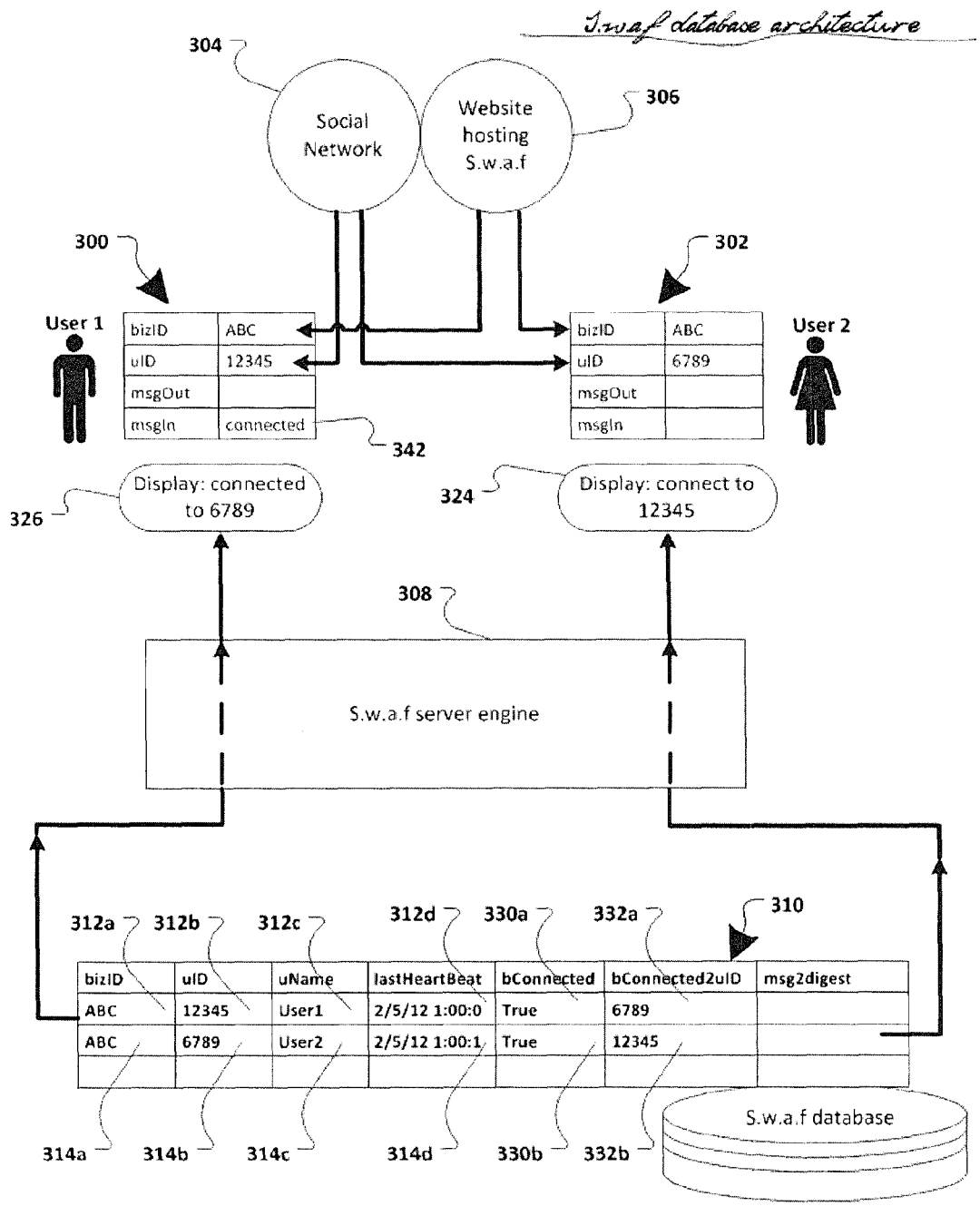

Referring now to FIG. 3d, in a case where User2 has accepted the request from User2, User2's s.w.a.f modules 302 may populate User1's row (312a-332a) in the database 310 with information confirming acceptance of the connection, etc. User1's s.w.a.f module 300 may then read that information, causing it to display 326 to User1 connection information. Likewise, User2 may see similar connection information 324.

Figure 3E:
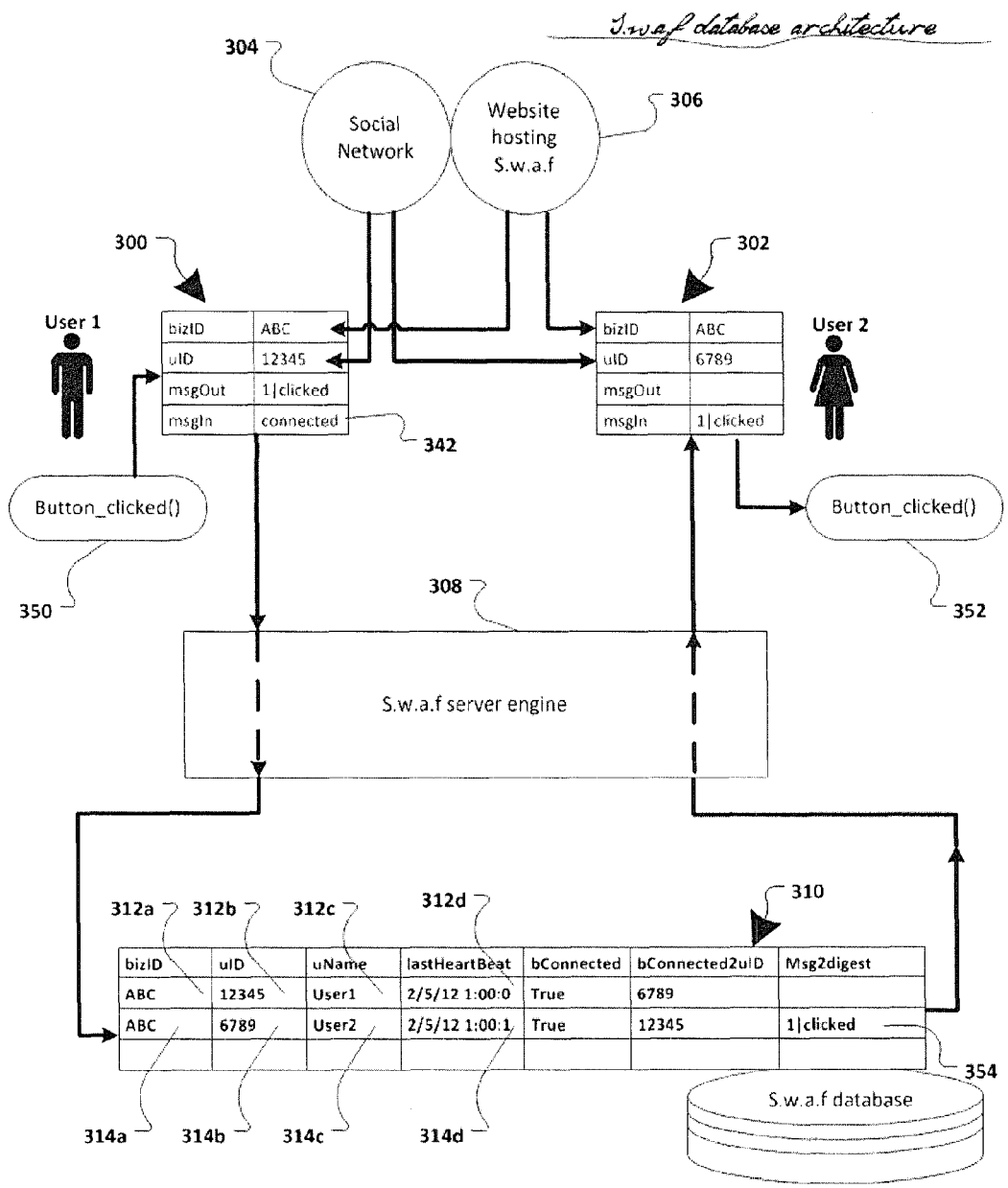

Once s.w.a.f connection has been established between User1 and User2, referring now to FIG. 3e, actions performed by one user may be automatically performed by the s.w.a.f mechanism for the other user. For example, a web browser used by User1 and displaying web content, may contain an element 350 (e.g. a button in this illustration, but generally an input field, a drop-down box, a YouTube® video control element, etc.)

An element's click event (e.g. button 350 being clicked) may trigger the s.w.a.f module 300 to process the click-event and transmit a message to the s.w.a.f server engine 308, causing the latter to write into the database 310 record of User2, an instruction to generate a click of the corresponding element/button within User2's web browser. The instruction may include information such as "1|clicked", where the "1" represents the element clicked, and the "clicked" represents the action. In related embodiment, and elements name/Id or any other information delimiting an element on a document, may be used.

The instruction may be received by the s.w.a.f module 302 of User2, when the latter queries the s.w.a.f server engine 308 for new pending messages. In addition to receiving the instruction, the s.w.a.f module 302 may process the instruction and execute a command within its web-browser document—in this case, generating an instruction to "click" button 352.

The resulting effect is that User2, while passive (i.e. not clicking the button 352) may observe that the button 352 is clicked automatically. In addition, the clicking of the buttons 350 and 352 may initiate a similar action for both users on their corresponding web browsers. For example, if both users are at an Amazon.com® virtual store, clicking the button 350 may initiate a purchase-flow for User1. However, as User1 and User2 are connected via the s.w.a.f mechanism, button 352 may be automatically-clicked for User2, also initiating a purchase-flow for User2 within User2's web browser.

Figure 4:
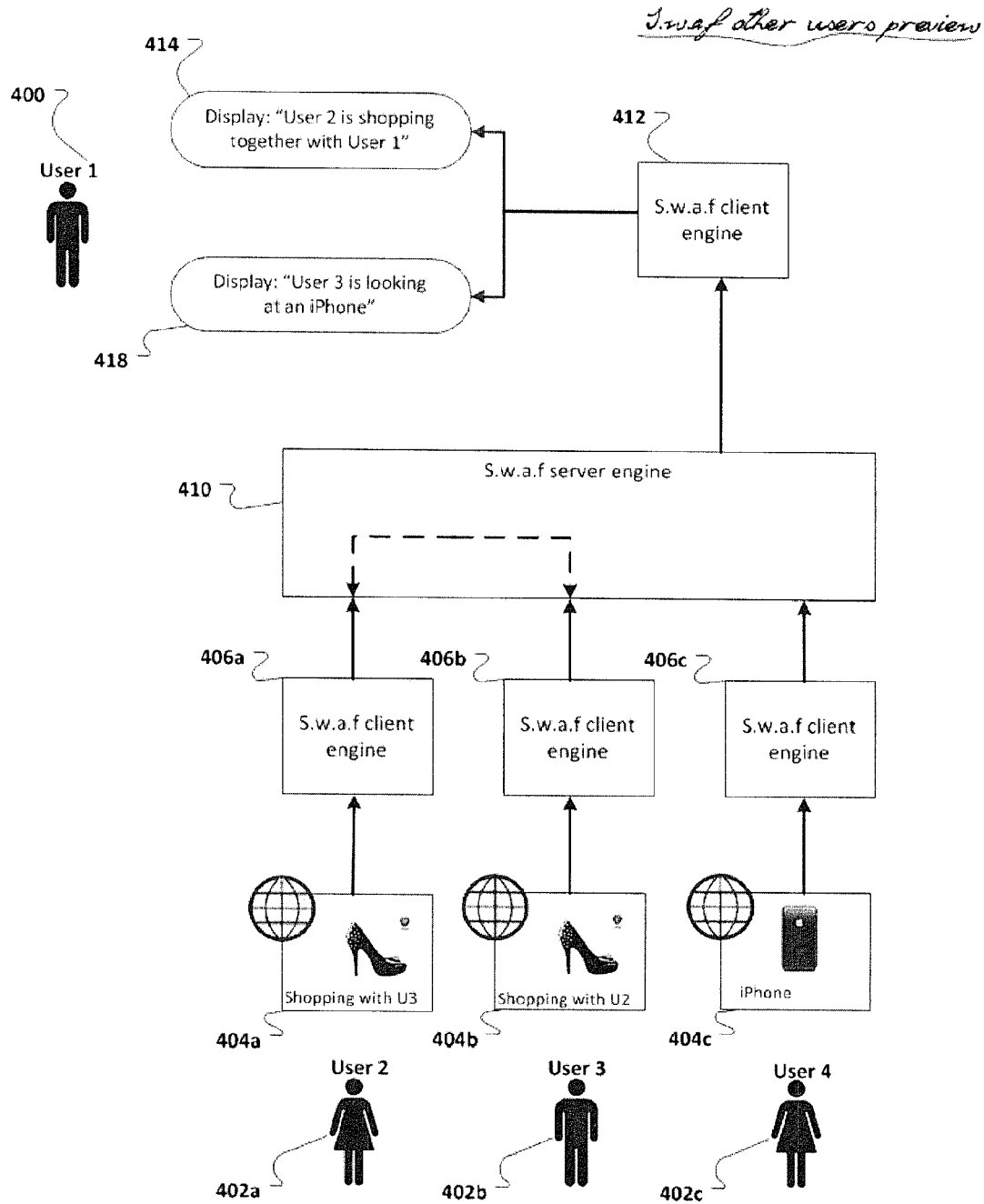
FIG. 4 is a generalized block diagram illustrating an ability of a user to preview activities of other users, via a s.w.a.f mechanism, in one possible embodiment of the present invention

FIG. 4 is a generalized block diagram illustrating an ability of a user to preview activities of other users, via a s.w.a.f mechanism, in one possible embodiment of the present invention. A user who is not-yet connected to any other user in a s.w.a.f session, may be privy to at least information regarding other users—e.g. friends—who are at a website that is part of a s.w.a.f system.

User1 400, User2 402a, User3 402b and User4 402c, may be on one or more website's that is part of a s.w.a.f system. These users may be at different geographic locations, accessing the website (or websites) from various different types of electronic devices and different web browsing applications. Further, these users may be viewing different things on the websites(s). For example, one user may be reading reviews on cameras, whereas another may be choosing a specific shoe in the right size.

A system that is s.w.a.f-enabled is "aware" of the activities of each user via a s.w.a.f client engine that is active within a document displayed in the browser of each user, and which communicates with a s.w.a.f server engine. For example, Users 402a-402c may access a website via browsers 404a-404c, respectively. The browsers 404a-404c, may display web content that includes s.w.a.f client engines 406a-406c, respectively, which may in turn, communicate with the s.w.a.f server engine 410.

Similarly, User1 400 may browse a s.w.a.f enabled website whose content includes the s.w.a.f client engine 412, also connected to the s.w.a.f server engine 410. Accordingly, one or more of the s.w.a.f client engines may present their corresponding users with information pertaining to other users' current browsing activities.

For example, in the illustration of FIG. 4, User2 402a and User3 402b are engaged in a joint-shopping session, and User4 402c is shopping for an iPhone. Accordingly, User1 400 may be notified of Users 2,3,4's activities, for example "User2 is shopping together with User1" 414 or "User 3 is looking at an iPhone" 418. Further, User 1 400 may be prompted to connect to any of the other users. In one presently-preferred embodiment, the connection may be facilitated with a single click on notifications 414 or 418, connecting to a live s.w.a.f session with Users 2 and 3 or User 4, respectively.

In various possible embodiments of the present invention, various privacy considerations may be implemented to control and limit users' view into other users activities. For example, but not limited to: allowing view only into activities of Facebook friends and/or allowing a user to specify a global setting on whether their shopping activities may be viewed, and/or allowing a business to specify rules, and/or allowing users to select specific friends/stores/items which may be visible to others, etc.

Figure 5A:
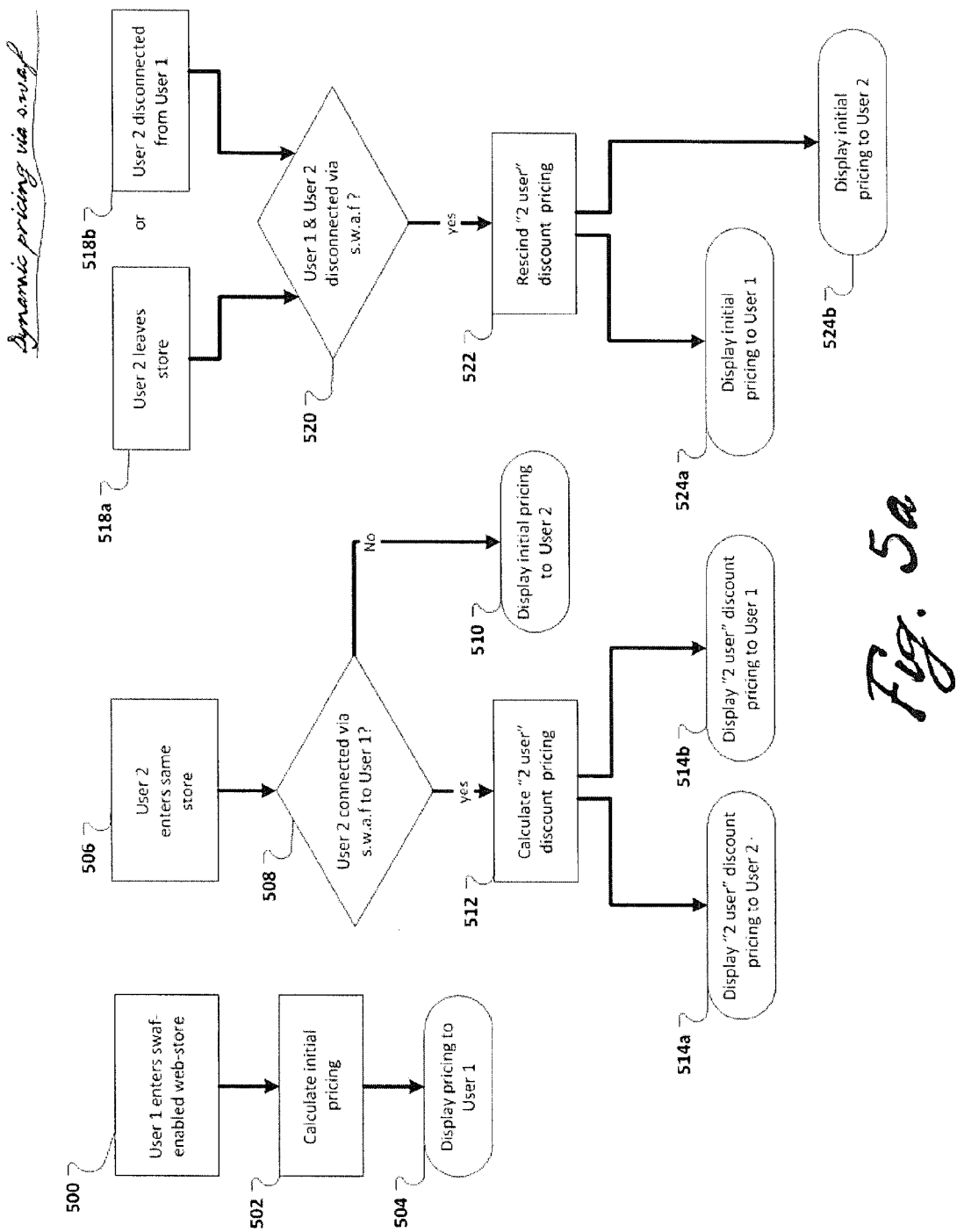
FIGS. 5a & 5b are generalized flow diagrams illustrating dynamic pricing in a system incorporating s.w.a.f technology, in once possible embodiment of the present invention.
Figure 5B:
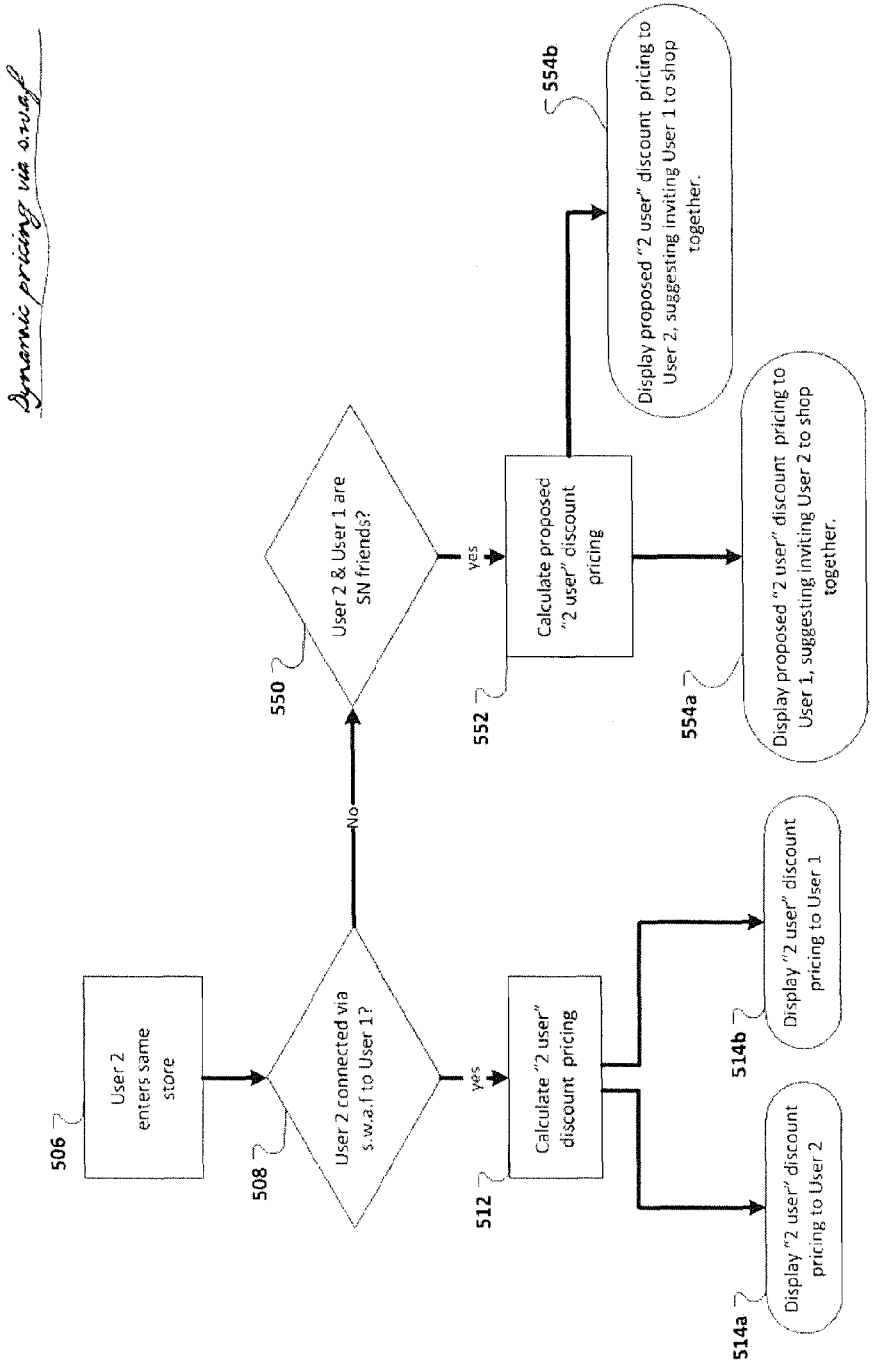

FIGS. 5a & 5b are generalized flow diagrams illustrating dynamic pricing in a system incorporating s.w.a.f technology, in once possible embodiment of the present invention. Merchants may offer groups of buyers discount pricing, especially in situations where a friend-brings-a-friend and all can make a decision at one time. Friends may also influence friends to buy a certain brand. For example, if four friends are co-shopping trying to collectively decide on running shoes, debating between Nike® and other brands, Nike® may decide to offer an instantaneous discount to all four friends if all commit to buying together.

At step 500, a user may enter a s.w.a.f-enabled website, for example Amazon.com®. In the prior art, at step 502, price for each item(s) may be calculated and presented to the user at step 504. For example, "Panasonic 40 in LED TV $500".

At step 506, a second user, User2, may enter the same store. At step 508, it may be determined whether User2 is connected via s.w.a.f to User1 (e.g. User2 has clicked on User1's picture and requested a shop-together experience, and User1 accepted.) If at step 508 it is determined User1 and User2 are not connected via a s.w.a.f session, User2 would be displayed the same pricing as User1 (i.e. "Panasonic 40 in LED TV $500").

If at step 508 it is determined User1 and User2 are connected via a s.w.a.f session, at step 512, special "discounted group pricing" may be computed for both user, and at steps 514a and 514b, Users 1 and 2, respectively, may be presented with the discounted price (e.g. "Panasonic 40 in LED TV $450, 10% discount") In various possible embodiments of the present invention, various business rules may apply, such as allowing discount only if both users commit to a purchase; usage of variable pricing/discounts etc. In addition, other users at the virtual store, not shopping together via s.w.a.f, may see other, e.g. standard, pricing.

Conversely, discount levels may be automatically adjusted downwards when less users are shopping together via s.w.a.f. If at step 520 it is determined that Users1 and 2 are disconnected, e.g. at step 518a User2 leaves the store/website; or at step 518b User1 and User2 become disconnected/choose to terminate shopping together, at step 522 the discount pricing may be rescinded for one or both users. As result, at steps 524a and 524b, Users1 and 2, respectively, may automatically see pricing revert to original pricing, i.e. "Panasonic 40 in LED TV $500".

In a related-possible embodiment of the present invention, users may be presented with "teaser pricing" should they invite their friends to shop together. For example, referring now to FIG. 5b, at step 506 User2 may enter the same virtual store as their friend, User1. At step 508, it may be determined whether User1 and User 2 are connected via a s.w.a.f mechanism, i.e. are co-shopping.

If at step 508 it is determined the two users are not already shopping together, at step 550 it may be determined whether User1 and User2 are friends (e.g. as defined by a social network such as Facebook®, wherein friendship is discerned from the users' social graphs.)

If it is determined at step 550 that User1 and User2 are friends, at step 552 proposed group-discounting may be calculated and presented to the user at steps 554a and 554b. For example, at step 554a, User1 may see a pop-up notification to the effect of "Your friend, User2, is available to shop together. Invite her and you will each receive a 10% discount on purchases." In a further embodiment, User1 may click on the pop-up to automatically invite User2 to shop together via the s.w.a.f mechanism.

Figure 6:
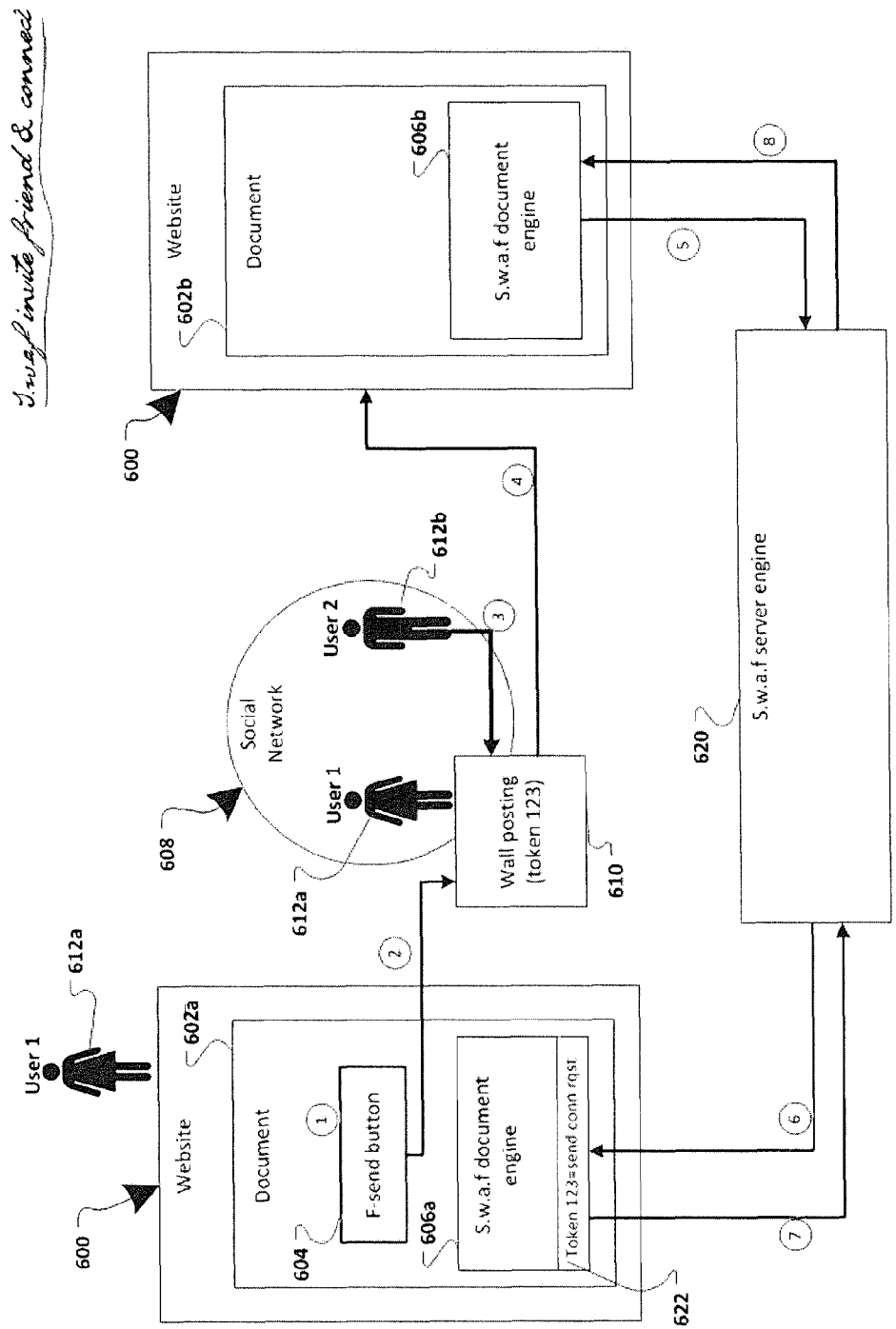
FIG. 6 is a generalized block diagram illustrating a s.w.a.f enabled system wherein a social-network "invite friends" control facilitates a one-click co-shopping experience between two users, in one possible embodiment of the present invention.

FIG. 6 is a generalized block diagram illustrating a s.w.a.f enabled system wherein a social-network "invite friends" control facilitates a one-click co-shopping experience between two users, in one possible embodiment of the present invention. Social network feature common controls, such as Facebook®'s "send" and "share" buttons, which allow a user to see a list of their friends, select one or more friends from the list, and send them a message through the social network. In the prior art, a friend receiving a message may click a hyperlink embedded in the invite-message and be taken to a different location (commonly the application/web-address from which the user had sent the invite.)

User1 612a may access a s.w.a.f-enabled website 600 (e.g. www.amazon.com or a Facebook®-application such as http://apps.facebook.com/shopzebedo) User1's web-browsing application, used to access the website 600, may contain a document 602a (a document generally refers to the content of a webpage rendered inside a user's browser, based on web content from a website.)

The document 602a may contain user-accessible elements and controls such as the Facebook® "send" button 604. Upon clicking the "send" button 604, User1 612a may be presented with a list of one-or-more social-network 608 friends. User1 612a may select a friend, e.g. User2, and send User2 612b an invite via the social-network.

In the prior art, an invite message 610 from a friend may be displayed on a wall associated with User1 and/or User2 in the social-network 608; or in a newsfeed of User1 and/or User2; or as a chat-message to User2, etc. User2 612b may select the invite message 610 displayed, and automatically be displayed the website 600 via his/her web browser, in the prior art.

In a s.w.a.f-enabled system, upon launching the website 600, User2 612b may be automatically connected to a s.w.a.f system, illustrated herein as comprising components 606a, 606b and 620. The s.w.a.f server engine 620 may broker a s.w.a.f connection between User1 612a and User2 612b, via s.w.a.f document engines 606a and 606b, respectively.

In one preferred embodiment of the present invention, the invite message 610 may content a unique token, e.g. "123", which may uniquely represents User1's invite of User2 to website 600. The s.w.a.f document engine 606b of User2 612b may transmit the content of the token, e.g. "123", to the s.w.a.f document engine 606a of User1 612a. In response, the s.w.a.f document engine 606a of User1 612a may automatically initiate a connection with the s.w.a.f document engine 606b of User1 612b; and, the s.w.a.f document engine 606b of User2 may automatically reply accepting the s.w.a.f joint-shopping invite.

In effect, User1 may use Facebook®'s "share" or "send" or any other social plug-in to invite User2 (via posting on own wall, User2's wall, in a chat, newsfeed, etc) User2 may then click on the invite and be presented with the web portal of the website from which User1 had sent the invite. User1 and User2 would then be automatically connected to each other via a s.w.a.f joint-shopping session.

Figure 7:
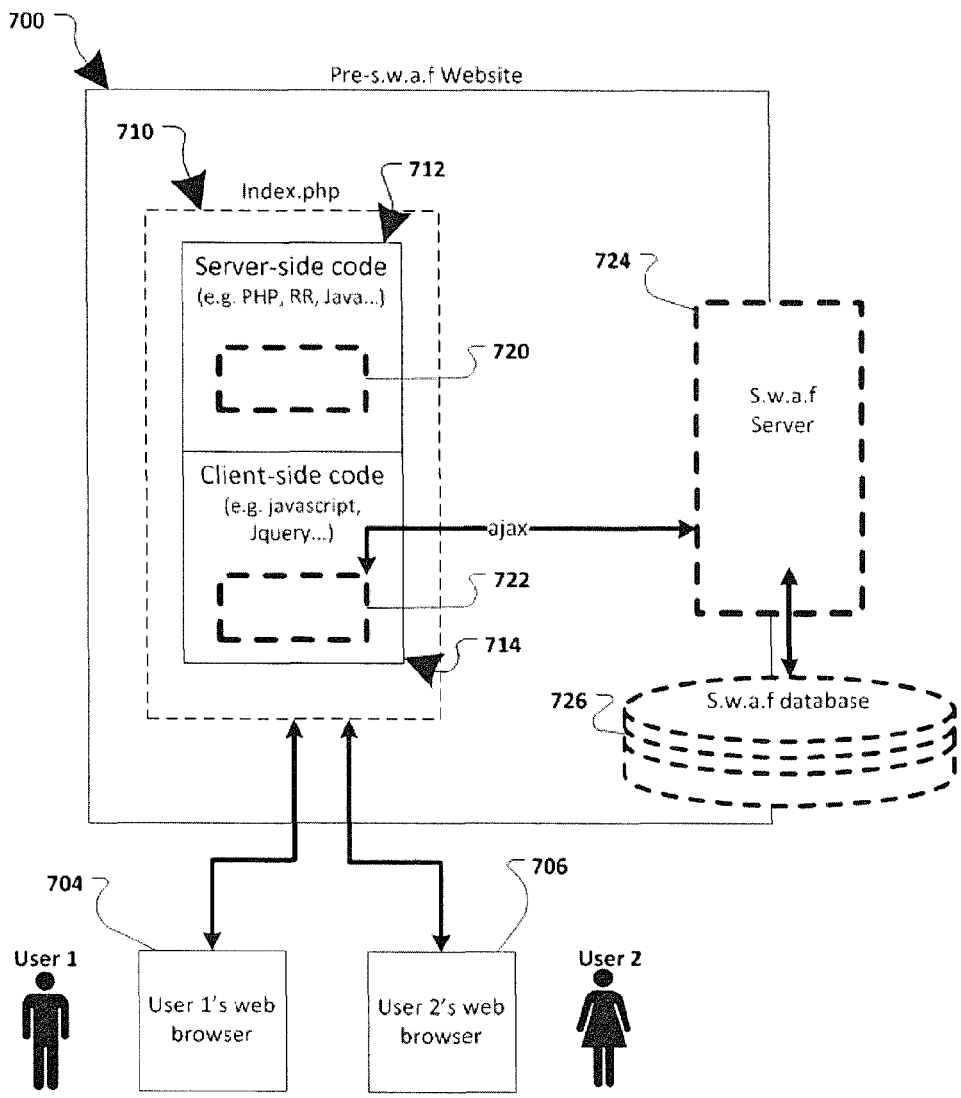
FIG. 7 is a generalized block diagram illustrating a s.w.a.f system augmenting a website, in one possible embodiment of the present invention.

FIG. 7 is a generalized block diagram illustrating a s.w.a.f system augmenting a website, in one possible embodiment of the present invention. A non-s.w.a.f website can be enhanced with s.w.a.f-enabling components, allowing the website to facilitate co-browsing/shopping among users.

A webstie 700, representing a non-s.w.a.f website, typically includes a main web-accessible file, e.g. "index.php" 710, accessible to users User1 and User2 using web browsers 704 and 706, respectively (e.g. when a user navigates to website's 700 URL, e.g. www.amazon.com, a main page such as index.php is typically accessed first.)

In common implementation in the prior art, the website 700 main page "index.php" 710 may contain two types of code: code for server-sided execution 712, and code for client-sided execution 722. The server-sided code is typically in the form of PHP, C++, Ruby on Rails, Jave, etc. The client-sided code is typically Javascript.

In the prior art, although User1 and User2 are both accessing the website 700, they are unaware of one another, and have no means of interacting. For example, if website 700 is Amazon.com®, User 1 may be accessing Amazon.com® from an iPhone to purchase a camera, whereas User2 may be accessing Amazon.com® from an Android-based device to browse for books; however, all the while, User1 and User2 are unaware of each other's presence and are unable to shop together.

In one preferred embodiment of the present invention, the website 700 may be augmented with s.w.a.f technology, allowing User1 and User2 to co-browse/shop. Further, the s.w.a.f technology does not require either User1 or User2 to install plug-ins or any other "screen sharing" technology on their respective client devices.

Four main s.w.a.f components may be added to the website 700 to enable User1 and User2 to co-browse/shop: a server-and-client s.w.a.f web-page components, 720 and 722 respectively, to index.php 710; and, a server-sided component 724 to the website; and a database 726.

The server-side s.w.a.f web-page components 720, and the client-side s.w.a.f web-page components 722, may be part of index.php 710, with the server-side s.w.a.f web-page components 720 embedded in the portion of the code of index.php 710 handling server-sided code 712; and, the client-side s.w.a.f web-page components 722 embedded in the portion of index.php 710 handling client-sided code 714.

The server-side s.w.a.f web-page components 720 may perform functions such as reading users' social graphs from a social-network, etc. The client-side s.w.a.f web-page components 722 may utilize Javascript or JQuery to perform at least the following functions: trigger off of elements in on the page index.php 710, communicate a state-change of the elements to remote users, receive communications from remote users and change the state of local elements in index.php 710.

The communication between the client-side s.w.a.f web-page components 722 and the s.w.a.f server 724, may utilize technology such as AJAX. The s.w.a.f server 724 may communicate with the s.w.a.f database 726. In various possible embodiments, the s.w.a.f server 724 and/or the s.w.a.f database 726 may be either internal to the website 700, jointly or severally, and/or external (e.g. hosted elsewhere on the Internet).

Figure 8:
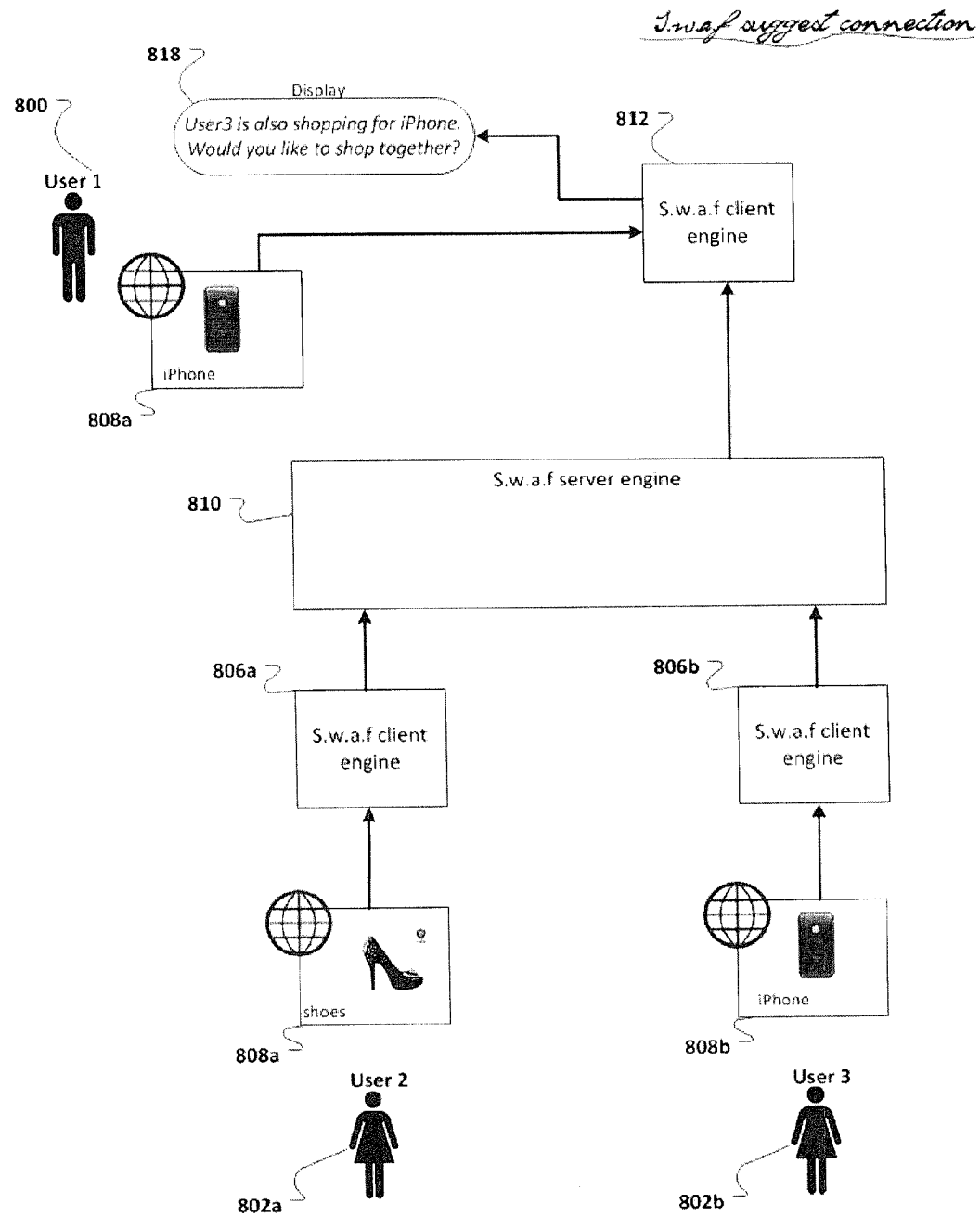
FIG. 8 is a generalized block diagram illustrating an ability to display suggestions to a user of connecting to other users who are shopping for similar items, via a s.w.a.f mechanism, in one possible embodiment of the present invention.

FIG. 8 is a generalized block diagram illustrating an ability to display suggestions to a user of connecting to other users who are shopping for similar items, via a s.w.a.f mechanism, in one possible embodiment of the present invention. A user browsing a website for one type of content, e.g. shopping for a type of items, may be privy to other information indicating other users, e.g. his/her friends, shopping for a similar type of item; and may be offered a one-click s.w.a.f. connection to them to shop jointly.

User8 400, User2 802*a* and User3 802*b*, may be on one or more website's that is part of a s.w.a.f system. These users may be at different geographic locations, accessing the website (or websites) from various different types of electronic devices and different web browsing applications. Further, these users may be viewing different things on the websites (s). For example, one user may be shopping for a new cell phone, whereas another may be choosing a specific shoe in the right size.

A system that is s.w.a.f-enabled is "aware" of the activities of each user via a s.w.a.f client engine that is active within a document displayed in the browser of each user, and which communicates with a s.w.a.f server engine. For example, Users 802*a*-802*b* may access a website via browsers 808*a*-808*b*, respectively. The browsers 808*a*-808*b*, may display web content that includes s.w.a.f client engines 806*a*-806*b*, respectively, which may in turn, communicate with the s.w.a.f server engine 810.

Similarly, User1 800 may browse a s.w.a.f enabled website whose content includes the s.w.a.f client engine 812, also connected to the s.w.a.f server engine 810. Accordingly, one or more of the s.w.a.f client engines may present their corresponding users with information pertaining to other users' current browsing activities.

For example, in the illustration of FIG. 8, User1 800 is shopping for an iPhone. Coincidentally, in the example, User3 802*b* is also shopping for an iPhone. Accordingly, User1 800 may be notified of User3's activities, for example "User32 is also shopping for iPhone. would you like to shop together?" 818. In one presently-preferred embodiment, the connection may be facilitated with a single click on notification 818, connecting to a live s.w.a.f session with Users 3. Similarly, User3 may also be notified of User1's shopping for a similar type of item, and may be offered a one-click-connect.

In one embodiment, the logic of presenting a user with notification of other users shopping for similar things, may take place in the user browser's own s.w.a.f client engine. The s.w.a.f client engine is aware of what its own user is shopping for; and receives information on other users' activities, and determines when to prompt its own local user of other users shopping for something similar.

In another possible embodiment, a s.w.a.f server engine may monitor the activities of users connected thru it; and may execute logic to send messages to users who are engaged in similar activities, offering them to join in a co-shopping experience.

In another possible embodiment, a s.w.a.f client engine may actively send solicitation to other s.w.a.f client engines, querying them for their users' activities and displaying information and invitation to connect to users who are engaged in a similar activity.

In various possible embodiments of the present invention, various privacy considerations may be implemented to control and limit users' view into other users activities. For example, but not limited to: allowing view only into activities of Facebook friends and/or allowing a user to specify a global setting on whether their shopping activities may be viewed, and/or allowing a business to specify rules, and/or allowing users to select specific friends/stores/items which may be visible to others, etc.

Figure 9:
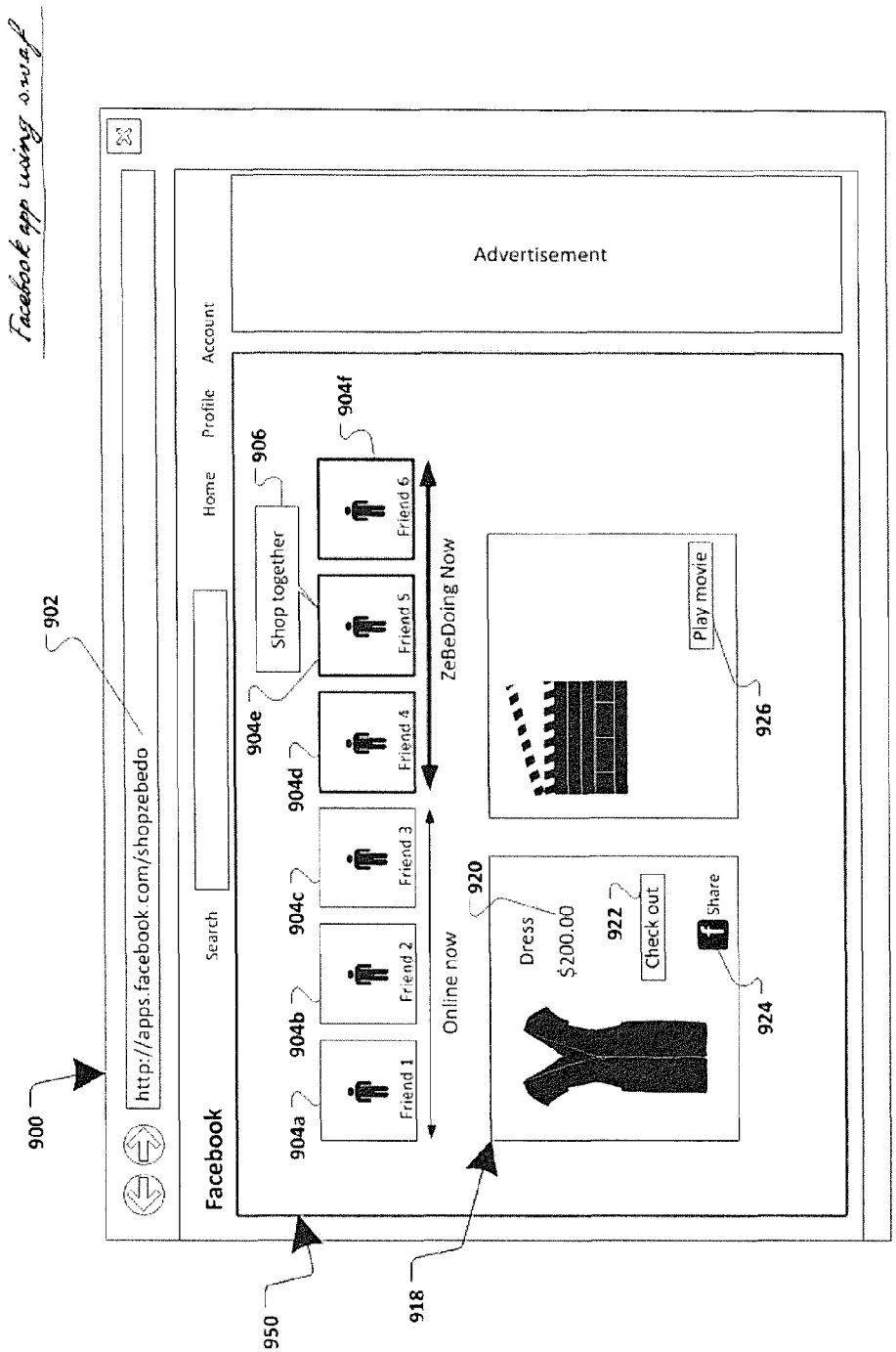
FIG. 9 is a generalized block diagram illustrating a Facebook® application, operating in conjunction with a s.w.a.f system, in one embodiment of the present invention.

FIG. 9 is a generalized block diagram illustrating a Facebook® application, operating in conjunction with a s.w.a.f system, in one embodiment of the present invention. A web-browsing application/browser 900 may display a URL 902 (uniform resource locator) such as "http://apps.facebook.com/shopzebedo", which, in the example, is an application displaying an application canvass page 950 within the Facebook® framework. The application canvass page 950 may be a web-application external to Facebook®, presented in a frame within Facebook®, and connected to Facebook®'s social graph.

In order to operate in conjunction with a s.wa.f system, the user's browser 900 does not need to include any addition software such as plug-ins, ActiveX controls, Adobe Flash® player etc.

A list of friends 904*a*-904*f* may be presented to a user. The friends 904*a*-904*f* may be Facebook® users who are friends of the current user, selected by various algorithms and sorted in various orders. For example, from left-to-right, friends 904*a*-904*c* may be ordered in order of their birthdays—from soonest to latest; or, alternatively, in order of their closeness to the user, etc. The friends 904*a*-904*c* may also represent users who are actively online, i.e. actively logged into Facebook®.

A list of users 904*d*-904*f* may be comprised of users who are actively connected to the s.w.a.f system (typically users using the website http://apps.facebook.com/shopzebedo, although other websites may be connected with the same s.w.a.f system.) The users 904*d*-904*f* may be available for immediate joint-shopping s.w.a.f session, given both their presence online and their existent connection to the underlying s.w.a.f system.

The user may be prompted with a visual queue 906 to connect to any of the friends 904*a*-904*f*. In the preferred embodiment, the visual queue 906 may be a popup that appears automatically when the user slides their cursor over one of the friends 904*a*-904*f*.

In the presently preferred embodiment, the user would "single click" on the visual queue 906, associated with a friend 904*a*-904*f*, and be automatically connected to that friend via a live s.w.a.f session. In the case of friends 904*d*-904*f*, a direct s.w.a.f message may be sent from a s.w.a.f client engine component in the user's browser 900 to corresponding s.w.a.f client engine component displayed in the friends' 904*a*-904*f* browser, prompting the friend to accept or reject a live s.w.a.f session.

In the case of friends 904*a*-904*c*, given that they are not actively connected to the s.w.a.f system, as per FIG. 6, these friends may be presented with a Facebook® message (e.g. on their wall, newsfeet, chat, etc.) asking them to navigate to the URL 902. Once these friends navigate to that URL (and optionally accept additional terms/register), they may be automatically connected to the s.w.a.f system; and, may be automatically joined into a joint live s.w.a.f session with the user. Selecting a Facebook® social plugin, such as "share" 924, may allow the user to select a friend or friends, who may or may not be displayed as friends 904*a*-904*f*, and for the selected friend(s) to be automatically connected to the present user via a live s.w.a.f session, once the selected friend(s) has/have navigated to the URL 902.

A product 918 may be displayed for viewing and for purchase. The user may browse through available products using one or more graphical controls; and, when in a live s.w.a.f session with one or more remote users, selecting a particular item 918 may cause that item to be selected for all connected users.

Similarly, the user's clicking on any other control in the browser 900 may cause that control to be clicked in browsers of all remote users connected to the user via a live s.w.a.f session. Similarly, the remote users' clicks on any controls in their browsers may cause a similar click to take place in the contents of the browser 900. For example, one user's clicking of the "check out" 920 button, beginning a checkout process (possibly with a merchant in a separate browser from 900) may cause the same "check out" 920 button to be automatically selected in a remote user's web browser, commencing the same purchase flow. Similarly, selecting a media-playing button, such as "play movie" (or "pause", "fast forward", etc.) 926, may cause a movie (e.g. off of Youtube®) to be played in the browser 900—and also within the browser of a fiend in a live s.w.a.f session.

It will be understood that the inventive system has been described with reference to particular embodiments, however additions, deletions and changes could be made to these embodiments without departing from the scope of the inventive system. Although the order filling apparatus and method have been described include various components, it is well understood that these components and the described configuration can be modified and rearranged in various other configurations.

What is claimed is:

1. A collaborative web browsing method comprising:
providing a server computer having a Shopping With A Friend (SWAF) server engine coupled to a database, a SWAF client engine coupled to the SWAF server engine and a plurality of client computers each having a web browser program that runs the SWAF client engine, the web browser program does not include a collaboration plug-in;
establishing by the SWAF server engine, a collaborative website;
displaying the collaborative website on each of the plurality of client computers;
detecting by the SWAF client engine, browser activity data of each of the plurality of client computers;
storing by the SWAF server engine, the browser activity data of each of the plurality of client computers through the SWAF server engine to the database at a first frequency; and
transmitting by the SWAF server engine, the browser activity data of each of the plurality of client computers that has been stored from the database to each other of the plurality of client computers at a second frequency, wherein the first frequency is slower than the first frequency; and
displaying the browser activity data from each of the plurality of client computers on each of the plurality of client computers.

2. A collaborative web browsing method comprising:
providing a server computer having a Shopping With A Friend (SWAF) server engine coupled to a database, a SWAF client engine coupled to the SWAF server engine and a plurality of client computers each having a web browser program that runs the SWAF client engine, the web browser program does not include a collaboration plug-in;
establishing, by the SWAF server engine, a collaborative website;
displaying by the SWAF server engine, the collaborative website on each of the plurality of client computers;
detecting by the SWAF client engine, browser activity data of a first client computer of the plurality of client computers;
storing by the SWAF server engine, the browser activity data of the first client computer of the plurality of client computers on the database at a first frequency; and
transmitting by the SWAF server engine, the browser activity data that has been stored from the database through the SWAF server engine to a second client computer of the plurality of client computers at a second frequency, wherein the first frequency is slower than the second frequency.

* * * * *